US009652495B2

(12) United States Patent
Kaiser

(10) Patent No.: US 9,652,495 B2
(45) Date of Patent: May 16, 2017

(54) TRAVERSAL-FREE UPDATES IN LARGE DATA STRUCTURES

(75) Inventor: Reiner K. Kaiser, Redondo Beach, CA (US)

(73) Assignee: Siemens Product Lifecycle Management Software Inc., Plano, TX (US)

(*) Notice: Subject to any disclaimer, the term of this patent is extended or adjusted under 35 U.S.C. 154(b) by 1041 days.

(21) Appl. No.: 13/418,424

(22) Filed: Mar. 13, 2012

(65) Prior Publication Data
US 2013/0246481 A1 Sep. 19, 2013

(51) Int. Cl.
*G06F 17/30* (2006.01)
*G06Q 10/08* (2012.01)

(52) U.S. Cl.
CPC ... *G06F 17/30424* (2013.01); *G06Q 10/0875* (2013.01)

(58) Field of Classification Search
CPC .......... G06Q 10/0875; G06F 17/30386; G06F 17/30321; G06F 17/30091; G06F 17/30289; G06F 17/30312; G06F 17/30607; G06F 21/629; G06F 9/4435
USPC ............................................. 705/29; 707/769
See application file for complete search history.

(56) References Cited

U.S. PATENT DOCUMENTS

| 5,197,001 A * | 3/1993 | Mukherjee ......... G06Q 10/0875 700/99 |
|---|---|---|
| 5,499,367 A | 3/1996 | Bamford et al. |
| 5,717,902 A | 2/1998 | D'Souza et al. |
| 5,724,575 A | 3/1998 | Hoover et al. |
| 5,873,075 A | 2/1999 | Cochrane et al. |
| 6,101,507 A | 8/2000 | Cane et al. |
| 6,125,369 A * | 9/2000 | Wu et al. ....................... 707/613 |
| 6,397,125 B1 | 5/2002 | Goldring et al. |
| 6,581,063 B1 * | 6/2003 | Kirkman .................. G06F 5/06 |
| 7,127,477 B2 * | 10/2006 | Duncombe ........... G06F 21/606 707/610 |
| 7,136,843 B2 | 11/2006 | Bigus et al. |
| 7,299,202 B2 * | 11/2007 | Swanson ..................... 705/26.5 |
| 7,343,364 B2 | 3/2008 | Bram et al. |
| 7,401,104 B2 | 7/2008 | Shah et al. |
| 7,412,432 B2 | 8/2008 | Kaminsky et al. |
| 7,490,112 B1 | 2/2009 | Suresh et al. |
| 7,493,344 B2 | 2/2009 | Wald et al. |
| 7,496,573 B2 | 2/2009 | Westendorf |
| 7,526,468 B2 | 4/2009 | Vincent et al. |
| 7,536,678 B2 | 5/2009 | Kothari et al. |
| 7,680,818 B1 | 3/2010 | Fan et al. |
| 7,685,183 B2 | 3/2010 | Pace et al. |

(Continued)

FOREIGN PATENT DOCUMENTS

WO WO 9806046 A1 2/1998

*Primary Examiner* — F. Zeender
*Assistant Examiner* — Milena Racic

(57) ABSTRACT

A PDM system, method, and computer program product for data transfer. A method includes determining a plurality of bill of material (BOM) components for a BOMLine by the PDM data processing system. The method includes determining a last export date for the BOMLine and determining a last saved date for at least one of the plurality of BOM components. The method includes creating an updated BOMLine corresponding to the components, without traversing a BOM structure, when the last saved date is more recent than the last export date, and publishing the updated BOMLine.

18 Claims, 3 Drawing Sheets

(56) References Cited

U.S. PATENT DOCUMENTS

| | | |
|---|---|---|
| 7,774,300 B2 | 8/2010 | Hsiao et al. |
| 7,844,561 B2 | 11/2010 | Kaminsky et al. |
| 8,126,844 B2 | 2/2012 | Kast |
| 8,781,922 B2 * | 7/2014 | Shafiee .................. G06Q 10/06 705/29 |
| 2001/0005849 A1 | 6/2001 | Boothby et al. |
| 2002/0165724 A1 | 11/2002 | Blankesteijn |
| 2003/0120902 A1 | 6/2003 | Kottapalli et al. |
| 2003/0208511 A1 | 11/2003 | Earl et al. |
| 2003/0212681 A1 | 11/2003 | Kasper |
| 2004/0250258 A1 | 12/2004 | Raghuvir et al. |
| 2005/0193028 A1 * | 9/2005 | Oswalt ................... G06Q 10/06 |
| 2006/0143227 A1 | 6/2006 | Helm et al. |
| 2006/0161894 A1 | 7/2006 | Oustiougov et al. |
| 2007/0027936 A1 | 2/2007 | Stakutis et al. |
| 2008/0077635 A1 | 3/2008 | Sporny et al. |
| 2008/0109496 A1 | 5/2008 | Holenstein et al. |
| 2010/0017395 A1 | 1/2010 | Wayn et al. |
| 2010/0274759 A1 | 10/2010 | Takeuchi et al. |
| 2011/0078122 A1 * | 3/2011 | Mayer et al. .................. 707/687 |
| 2011/0167037 A1 | 7/2011 | Kaiser |
| 2011/0178998 A1 | 7/2011 | Nizami et al. |
| 2011/0179059 A1 * | 7/2011 | Kaiser ............... G06F 17/30513 707/769 |
| 2011/0191299 A1 | 8/2011 | Huynh et al. |
| 2011/0295796 A1 * | 12/2011 | Muhunthan ....... G06F 17/30575 707/610 |
| 2013/0124562 A1 * | 5/2013 | Christensen et al. ......... 707/770 |

* cited by examiner

TRAVERSAL-FREE UPDATES IN LARGE DATA STRUCTURES

CROSS-REFERENCE TO OTHER APPLICATION

The present application has some figures or specification text in common with, but is not necessarily otherwise related to, U.S. patent application Ser. No. 13/418,433 for "Bulk Traversal of Large Data Structures", filed concurrently herewith, that is hereby incorporated by reference. Commonly-assigned U.S. Patent Applications 61/292,186 (filed Jan. 5, 2010), Ser. No. 12/984,656 (filed Jan. 5, 2011), Ser. No. 12/690,180 (filed Jan. 20, 2010), and Ser. No. 12/690,188 (filed Jan. 20, 2010) are also incorporated by reference herein.

TECHNICAL FIELD

The present disclosure is directed, in general, to data management systems and methods, including computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include a system, method, and computer program product for data transfer. The method includes determining a plurality of bill of material (BOM) components for a BOMLine by the PDM data processing system. The method includes determining a last export date for the BOMLine and determining a last saved date for at least one of the plurality of BOM components. The method includes creating an updated BOMLine corresponding to the components, without traversing a BOM structure, when the last saved date is more recent than the last export date, and publishing the updated BOMLine.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software, or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
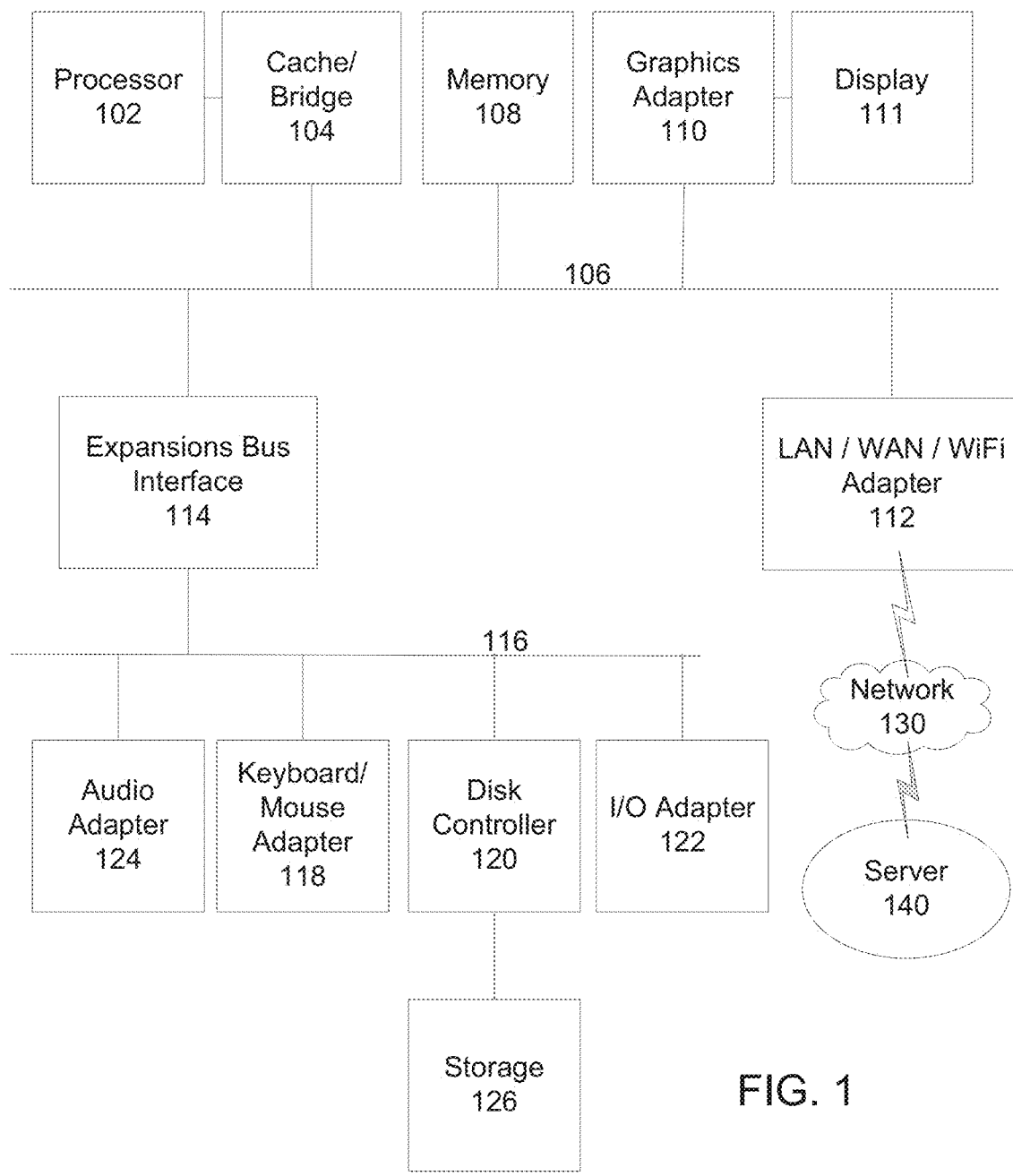
FIG. 1 depicts a block diagram of a data processing system in which an embodiment can be implemented.
Figure 2:
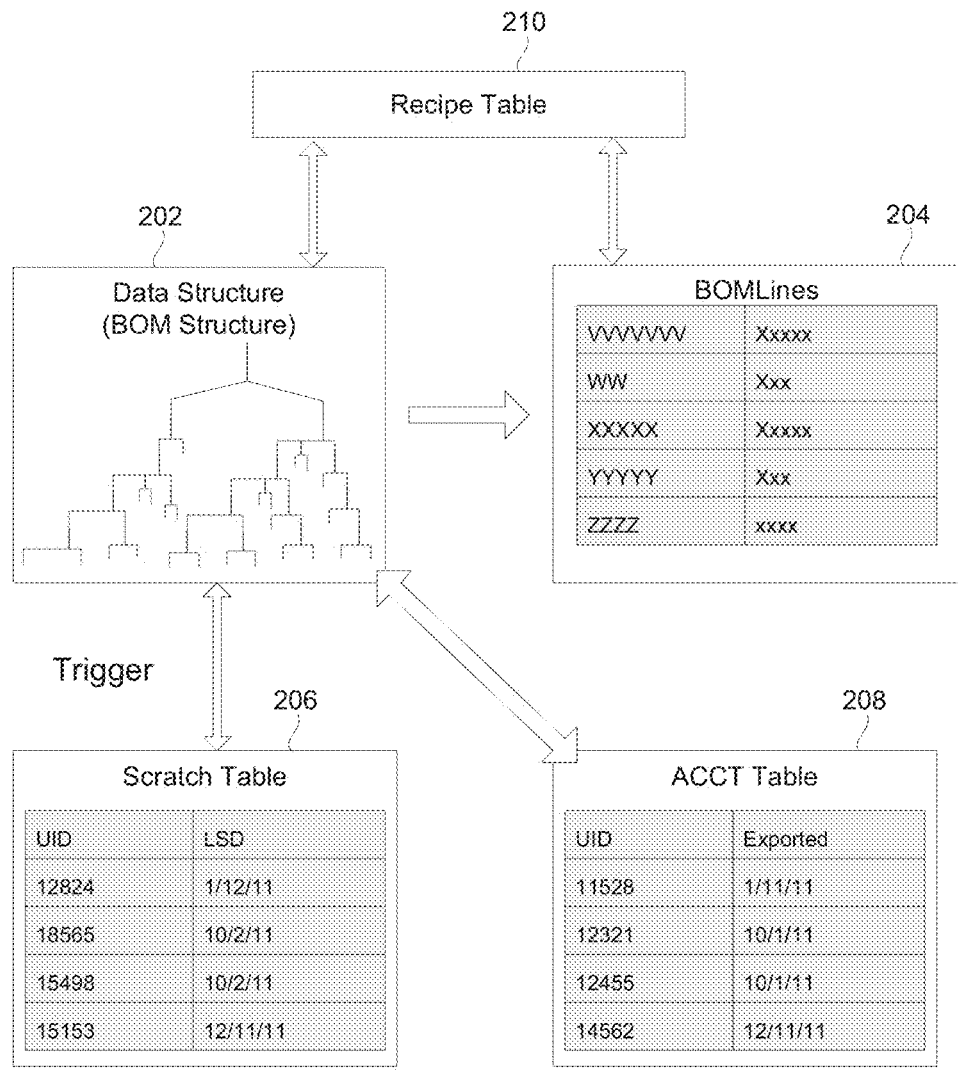
FIG. 2 depicts a simplified block diagram of various data structures and relations that can be used in accordance with disclosed embodiments.
Figure 3:
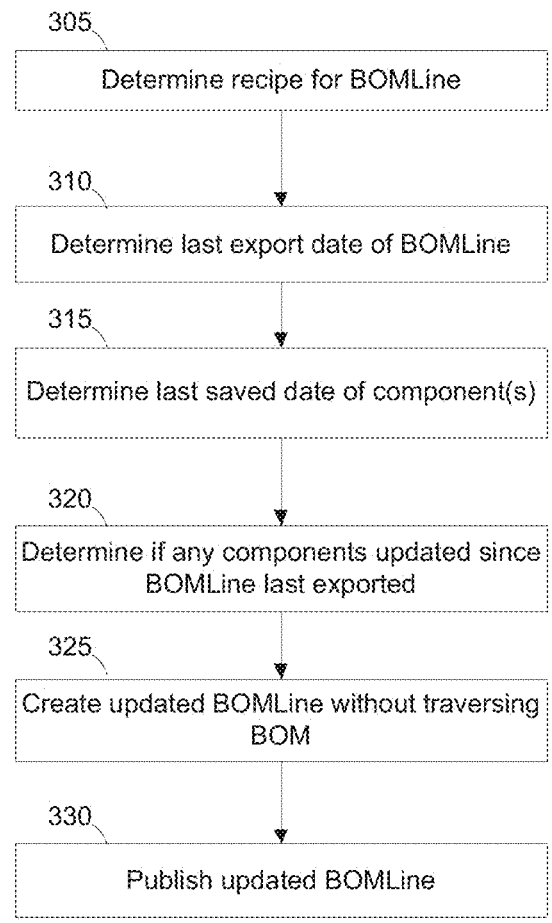
FIG. 3 depicts a flowchart of a process in accordance with disclosed embodiments, for updating a BOMLine in a PDM data processing system.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Many data management systems, including PDM systems, have to support an ever-increasing data model, supporting more and more applications, many of which manage data heavily customized by individual customers or users. Objects in the data model can be continually updated or otherwise modified, and these updates must be synchronized, backed up, or otherwise processed. Conventional techniques require traversing the entire data structure to identify the elements that have been updated.

Configuration and traversal of large data structures such as PDM BOM structures is complex and consumes significant time and memory. In many cases, downstream applications consume such structures and construct their own data models and processes based on the content of such structures. It is crucially important to keep such downstream data and processes up to date with respect to any evolving changes of the master structure.

Conventionally, identification of such changes of a BOM structure on a periodic basis, such as hourly or nightly, has been conducted by re-traversing the structure top to bottom, and analyzing changes of individual constituents of that structure by comparing their time stamps of latest changes with the last time such analysis was performed.

In general, it is not possible to derive from the state of a parent object whether any of its child objects and subsequent referencers require updating. Therefore, this traversal approach is usually expensive with effort more or less proportional to the size of the structure and not the size of the change (which can be very small or even non-existent). In general, only a small percentage of a BOM structure changes on a nightly basis, and it is those changes that must be identified and synchronized in the highest possible efficient manner.

Disclosed embodiments include systems and methods for identifying and tracking updates without requiring traversal of the data structure. Disclosed techniques can be used, for example, wherever there is a need of identifying incremental updates within a configured product structure. Disclosed techniques can be used with any such object model including but not limited to Product Structure data such as CAD assembly data, Structure Documents, Manufacturing Process/Plant, Product Life Cycle data, other PDM data, and otherwise. Disclosed embodiments can efficiently update the specific objects in large structures, such as the Items, Occurrences, Datasets, Attachments, other Attributes, and other objects in a BOM structure.

Disclosed embodiments implement a traversal-free process that can identify candidates of BOMLines (i.e. elements of the BOM structure) which could have potentially been modified, while eliminating with certainty the overwhelming majority of such BOMlines which guaranteed have not been modified. This then permits re-examination and re-configuration of this substantially smaller subset of candidate lines, a task which is proportional to the (very small) change and not proportional to the size of the structure itself.

The identification of such candidates can include various concepts and constructs described in more detail below. These can include a database trigger mechanism which records any create/delete/update of objects in the database, irrespective of whether or not such objects might be related or relevant to the structure of interest, and a list of persisted "recipe" objects required to compose the BOMLine of interest. A simple query is then sufficient to identify all BOMLines for which there was a potential change of one or many of its objects in the recipe table. The system can identify the recipe objects, but actually creating the recipe objects is not required as part of the processes described herein.

FIG. 1 depicts a block diagram of a data processing system in which an embodiment can be implemented, for example as a PDM data processing system configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data, processing system 100.

Disclosed embodiments describe processes relating to updating and publishing of large data structures. The techniques disclosed herein are particularly useful with BOM structures, and the specific examples described below related to BOM structures, but those of skill in the art will recognize that the disclosed techniques are not limited to BOM structure implementations, and can be applied to elements of other large data structures, not just the BOM-Lines of BOM structures as described in the examples below.

FIG. 2 depicts a simplified block diagram of various data structures and relations used in disclosed processes, each of which can be stored in a storage or memory of one or more PDM data processing systems as described herein.

In this example, the system stores and maintains a BOM structure 202. Data from the BOM structure 202 can be extracted, based on appropriate configurations, contexts, or queries, into BOMLines 204. Processing of updated BOM-Lines 204 on a regular basis is imperative if the user wants to see an up-to-date representation of the BOM represented by BOM structure 202. This must be done without massive re-traversal of the entire structure because otherwise this kind of update operation would not be possible on an hourly or nightly basis, assuming a substantial number of contexts or configurations with a potentially very large number of BOMLines.

In order to avoid re-traversal of large structured sets of persisted objects in case only a small number of objects in such a set have changed, disclosed embodiments maintain information related to newly created and modified objects. The system stores and maintains a scratch table 206 ("SCRATCH Table") that contains any newly created or modified objects, and can be populated during a database trigger operation which fires when a persisted Object is created, modified, or deleted. This table is very compact, and can essentially just store the object unique/universal identifier (UID) and a last saved date (LSD) of that object. The LSD can be a very specific timestamp; it is not necessarily as coarse as simply the date.

The system can also store and maintain an accountability table ("ACCT Table") 208 that records all objects or BOMLines that were already exported, and can reflect the state of the structure at the time of the previous export. Consider the following query:

```
select distinct acct.exp_obj_uid, scratch.puid from %s acct,
    %s pombp, %s scratch
where (acct.state = '%d' and scratch.trigger_condition = '%d')
and (scratch.lsd > acct.led)
and ((acct.exp_obj_uid = pombp.to_uid and scratch.puid =
pombp.from_uid)
or (acct.exp_obj_uid = pombp.from_uid and scratch.puid =
pombp.to_uid))"
```

This exemplary query causes the system to search for all objects in the BOM structure that are connected to objects in the accountability table either by forward or back pointer. The system can thereby enable a user to find any newly created or modified objects which are connected to objects in the acct table. These can include, for example, newly added Occurrences, changed end Items, added attachments, and other similar new or modified objects. Further, the system can execute closure rules against any found objects to make sure they are in fact relevant.

The disclosed approaches can be generalized to BOMLines and other runtime objects. In a PDM context, BOMLines are runtime objects and there is no single mechanism or variable to keep track of the "last modified date" of a BOMLine in a conventional system. Instead, disclosed embodiments can store BOMLines in new temporary tables. For example, in some embodiments the system can track BOMLine updates in a client and trigger updates of the last saved date of a persisted BOMLine whenever a user modifies something related to that BOMLine, and there are many other workflows which would trigger updates of data feeding into a BOMLine that are considered within the scope of this disclosure.

Therefore, disclosed embodiments also keep track of changes feeding into the formulation of a BOMLine. Mathematically speaking, a BOMLine is a function of certain persisted objects $$Bl\_n = f(o1, o2, \ldots om)$$

Where o1, . . . om are persisted objects. The last saved date of the BOMLine is then $$lsd(bl\_n) = \max(lsd(o1), lsd(o2), \ldots, lsd(om))$$

By tracking all of the persisted objects constructing a BOMLine, referred to as the "recipe," the system can then determine the last saved date of the line from scratch table 206 and perform a simple query to find out which lines have updated. The system can do so by re-using the algorithm outlined above but this time utilizing the last saved dates of each of the objects in the recipe.

For example, assuming that temporary runtime objects have a variable length array of recipe_uids, then the system can use an update requirement, based on updates to any of the objects in that recipe list, as follows:

```
select distinct temp_acct.exp_obj_uid, pomobject.puid
WHERE            temp_acct.last_export_date            <
(select Max(pomobject.lsd) from pomobject
    where pomobject.uid in temp_acct.recipe_uids);
```

This query finds the latest change of any of the contributing persisted objects in a BOMLine recipe and pulls the BOMLine into update if that maximum is later than the last export date based on the accountability table. This list of objects can then be provided to the configuration engine, which can use it to filter out any lines that do not require update. Going one step further, the system can also utilize parent/child relationships in the acct table to determine whether child line expand is even necessary for a given line; no expand is necessary if nothing has changed underneath that line.

The system can also take into account any new/modified objects which, while not yet in the recipe list, reference an object in the recipe list. Examples for this are newly added Occurrences, attachments, etc.

In PDM system implementations that use "backpointer tables", i.e., tables keeping track of all forward and backward references between objects, the system can formulate or use additional queries identifying such potential connections by performing a query that has a join with the backpointer table. Such references can then also be filtered further by relevance by analyzing each of the references. Alternatively or additionally, the system can add the line to the list of candidates and then use processes as described herein to find the update.

The system can therefore create updated and current BOMLines 204, in accordance with any given query, context, or configuration, by using the scratch table 206 and accountability table 208 to determine which items from the BOM structure 202 have been updated, modified, or previously exported, and so can avoid traversing the entire BOM structure 202.

In some embodiments, persistent objects that construct the BOMLines are recorded in a recipe table 210. When this is the case, the object "recipes" can be easily retrieved rather than derived or determined on the fly.

FIG. 3 depicts a flowchart of a process in accordance with disclosed embodiments, for updating a BOMLine in a PDM data processing system. The BOMLine can describe, for example, a configured product, part, or assembly.

The system determines a plurality of BOM components for a BOMLine (step 305). The plurality of components can form the recipe described above; the properties of the BOM line are a function of the constituents of the recipe. Each of the components can be associated with a respective unique identifier. The system can store and maintain the plurality of components in a recipe table as described herein.

The system determines a last export date of each BOMLine (step 310). This step can include looking up the BOMLine or each of the plurality of components in an accountability table stored and maintained by the system.

The system determines a last saved date for at least one of the plurality of components (step 315). For example, the system can identify any of the components that have entries in a scratch table stored and maintained by the system as described herein. This step can include monitoring updates and other changes to each of the objects and components using a trigger mechanism, and storing the last saved date for each such change in the scratch table when the trigger mechanism is activated.

The system compares the last saved date to the last export date for at least one of the plurality of components to determine if the component has been updated/saved since its BOMLine was last exported (step 320). For example, the system identifies any component in the recipe that has a more recent last-saved-date in the scratch table than the last-export-date of its BOMLine in the accountability table.

The system creates the updated BOMLine according to the plurality of BOM components, without traversing the BOM structure (step 325). This can include retrieving from the BOM structure only those components that have been updated or saved since they were last exported.

Creating the updated BOMLine can include several different scenarios, depending on the changes to the component. The updated BOMLine can be a newly-created BOMLine in some cases, or can be a modification of a previously-configured BOM Line. Further, in some cases, the changes in the components or recipes may require that a previously-configured BOMLine is no longer used; in this case, the parent BOMLine of the "deleted" BOMLine should be updated to reflect the removed child BOMLine.

The system can configure, serialize, save, or otherwise publish the updated BOMLine (step 330).

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art. Various steps, processes, and components can be omitted, replaced, or rearranged in accordance with various embodiments, and should not be considered essential to any specific embodiment unless specifically claimed below.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a product data management (PDM) data processing system, comprising:
    determining a plurality of bill of material (BOM) components for a BOMLine by the PDM data processing system, wherein properties of the BOMLine are a function of the plurality of BOM components, and wherein the BOMline is a runtime object and the plurality of BOM components are persisted objects;
    determining a last export date for the BOMLine;
    determining a last saved date for at least one of the plurality of BOM components;
    creating an updated BOMLine corresponding to the components, without traversing a BOM structure, when the last saved date is more recent than the last export date; and
    publishing the updated BOMLine.

2. The method of claim 1, wherein the PDM data processing system retrieves, from the BOM structure, any of the plurality of components for which the last saved date is more recent than the last export date.

3. The method of claim 1, wherein the PDM data processing system stores a plurality of components for each of a plurality of BOMLines in a recipe table.

4. The method of claim 1, wherein the PDM data processing system stores a last export date for each of a plurality of BOMLines in an accountability table.

5. The method of claim 1, wherein the PDM data processing system monitors changes to each of the components using a trigger mechanism, and stores the last saved date for each such change in a scratch table when the trigger mechanism is activated.

6. The method of claim 1, wherein the PDM data processing system also identifies other objects in the BOM structure that are connected to objects in an accountability table by a forward pointer or a back pointer.

7. A product data management (PDM) data processing system comprising a processor and accessible memory, the data processing system particularly configured to:
    determine a plurality of bill of material (BOM) components for a BOMLine by the PDM data processing system, wherein properties of the BOMLine are a function of the plurality of BOM components, and wherein the BOMLine is a runtime object and the plurality of BOM components are persisted objects;
    determine a last export date for the BOMLine;
    determine a last saved date for at least one of the plurality of BOM components;
    create an updated BOMLine corresponding to the components, without traversing a BOM structure, when the last saved date is more recent than the last export date; and
    publish the updated BOMLine.

8. The PDM data processing system of claim 7, wherein the PDM data processing system retrieves, from the BOM structure, any of the plurality of components for which the last saved date is more recent than the last export date.

9. The PDM data processing system of claim 7, wherein the PDM data processing system stores a plurality of components for each of a plurality of BOMLines in a recipe table.

10. The PDM data processing system of claim 7, wherein the PDM data processing system stores a last export date for each of a plurality of BOMLines in an accountability table.

11. The PDM data processing system of claim 7, wherein the PDM data processing system monitors changes to each of the components using a trigger mechanism, and stores the last saved date for each such change in a scratch table when the trigger mechanism is activated.

12. The PDM data processing system of claim 7, wherein the PDM data processing system also identifies other objects in the BOM structure that are connected to objects in an accountability table by a forward pointer or a back pointer.

13. A non-transitory computer-readable storage medium encoded with computer-executable instructions that, when executed, cause a product data management (PDM) data processing system to:
   determine a plurality of bill of material (BOM) components for a BOMLine by the PDM data processing system, wherein properties of the BOMLine are a function of the plurality of BOM components, and wherein the BOMLine is a runtime object and the plurality of BOM components are persisted objects;
   determine a last export date for the BOMLine;
   determine a last saved date for at least one of the plurality of BOM components;
   create an updated BOMLine corresponding to the components, without traversing a BOM structure, when the last saved date is more recent than the last export date; and
   publish the updated BOMLine.

14. The computer-readable storage medium of claim 13, wherein the PDM data processing system retrieves, from the BOM structure, any of the plurality of components for which the last saved date is more recent than the last export date.

15. The computer-readable storage medium of claim 13, wherein the PDM data processing system stores a plurality of components for each of a plurality of BOMLines in a recipe table.

16. The computer-readable storage medium of claim 13, wherein the PDM data processing system stores a last export date for each of a plurality of BOMLines in an accountability table.

17. The computer-readable storage medium of claim 13, wherein the PDM data processing system monitors changes to each of the components using a trigger mechanism, and stores the last saved date for each such change in a scratch table when the trigger mechanism is activated.

18. The computer-readable storage medium of claim 13, wherein the PDM data processing system also identifies other objects in the BOM structure that are connected to objects in an accountability table by a forward pointer or a back pointer.

* * * * *